United States Patent [19]
Wolf

[11] 3,964,394
[45] June 22, 1976

[54] PYROCHEMICAL GAS GENERATOR

[75] Inventor: Siegfried Wolf, Taufkirchen, Germany

[73] Assignee: Bayern-Chemie Gesellschaft fur Flugchemische Antriebe mit beschrankter Haftung, Germany

[22] Filed: Sept. 18, 1974

[21] Appl. No.: 507,134

[30] Foreign Application Priority Data
Oct. 5, 1973  Germany............................ 2350104

[52] U.S. Cl. ................................. 102/39; 23/281; 280/728
[51] Int. Cl.² ............................................ F42B 3/04
[58] Field of Search .......... 102/39, 90; 280/150 AB; 222/3; 23/281

[56] References Cited
UNITED STATES PATENTS

| | | |
|---|---|---|
| 3,202,240 | 8/1965 | Treiber ............................ 181/53 X |
| 3,532,360 | 10/1970 | Leising et al. ................. 280/150 AB |
| 3,618,981 | 11/1971 | Leising et al. ................. 280/150 AB |
| 3,647,393 | 3/1972 | Leising et al. ................. 280/150 AB |
| 3,733,180 | 5/1973 | Heineck et al. ............... 280/150 AB |
| 3,827,715 | 8/1974 | Lynch ................................... 102/39 |
| 3,845,970 | 11/1974 | Herrmann .................... 280/150 AB |
| 3,871,684 | 3/1975 | Staudacher ............................ 102/39 |

Primary Examiner—Samuel W. Engle
Assistant Examiner—Harold Tudor
Attorney, Agent, or Firm—McGlew and Tuttle

[57] ABSTRACT

A pyrochemical gas generator, comprises a cylindrical receptacle which includes a hollow cylindrical bottom portion having an interior bottom wall with a plurality of individual cylindrical recesses for receiving individual charges defined directly on the bottom wall. The bottom wall also includes annular grooves which interconnect the recesses and provide a gas passage after ignition of the charges. The bottom includes a central upstanding hub portion and a firing plate which has an apertured hub portion is disposed over the bottom and its hub portion is spaced from that of the bottom to define a primer charge chamber therebetween in which a primer charge is positioned. An intermediate housing which has a lower cylindrical portion is engaged over the firing plate and around the periphery of the bottom portion and it has a dividing wall with a plurality of upstanding partition walls. A top cover is engaged over the intermediate housing by being threaded onto the hub portion and it has a plurality of depending partition walls which are located between the upstanding walls of the intermediate housing. The spaced apart partition walls define gas passes which are communicated with the lower portion through a passage which may be regulated in size by the amount of threading of the cover onto the hub portion. The spaces between the partition walls open outwardly and they provide a sound absorber.

8 Claims, 2 Drawing Figures

PYROCHEMICAL GAS GENERATOR

FIELD AND BACKGROUND OF THE INVENTION

This invention relates in general to the construction of gas generators and, in particular, to a new and useful pyrochemical gas generator, particularly for generating gases for inflating inflatable personnel and object-protection devices and which includes a receptacle having a bottom portion containing the charges with gas passages between individual charges which communicate upwardly with a sound absorbing portion of the housing.

DESCRIPTION OF THE PRIOR ART

In a known gas generator, the space containing the pyrochemical mixture is subdivided by a perforated part into two concentric chambers. The primer charge is located in the inner chamber and the ignition gases escaping from the chamber move radially outwardly to ignite the concentrically disposed power charge. Since the power charge comprises a granulated fuel having no definite burn-up surface, the burn-up velocity and the burn-off time cannot be exactly determined. However, with devices which protect objects against rebounds, for example, a person in a motor vehicle crash, such devices must be filled within exactly defined filling periods because the pressure development in the protective device and, consequently, the protective effect of this device, will depend upon this operation.

SUMMARY OF THE INVENTION

The present invention provides a gas generator which may be operated so as to exactly predetermine the burn-off time of the pyrochemical mixture and to determine the pressure variation of the developed gas. In accordance with the invention, this is obtained by providing the pyrochemical mixture in the form of a plurality of charges which burn all around their periphery and which are seated in corresponding recesses defined in the bottom of a lower part of a receptacle which is constructed so that, during the burn-off time, an almost uniform burn-up surface is maintained.

Charges which burn completely around their peripheries are known in the field of solid fuel technology. They comprise, for example, discs of various shape made of wound foils or of annular bodies. A particularly advantageous solution of the given problem of providing an all around burning charge is characterized in that the charges have a circular cylindrical form and they are located in the lower part of a receptacle which has a plurality of recesses concentrically arranged in one or more rows. The charges are all arranged in the receptacle so as to insure a burning-off on all of their sides. In accordance with the invention, this is obtained by providing the bottom of the power part with concentrical circular grooves in which the recesses for receiving the charges are located.

According to a development of the invention, the cover of the receptacle comprises a sound absorber which is of known construction in itself, but which is formed in a novel manner with the receptacle and which is made up of a plurality of deflection steps whose interior is connected through a bore to the collector space. The effect of this arrangement is that the crack produced at the gas expansion is largely damped. Due to the deflection steps provided in the sound absorber by spaced upstanding and depending partition walls, the gas is expanded and its temperature is reduced. A filter gauze is advantageously mounted at the periphery of the sound absorber and surrounds the outermost deflection step of the sound absorbing arrangement and it retains the combustion residues contained in the escaping gases.

In order to secure the sound absorber to the receptacle centrically, a centrically threaded journal is provided on the bottom of the lower part, constructed in accordance with the invention. The closure portion of the sound absorber is therefore screwed directly over the threaded journal and the amount of the threading thereon regulates the passage openings between the charge chamber and the sound absorbing chamber. According to a further feature of the invention, the electric primer capsules are placed adjacent the centric threaded journal within an annular chamber in which the booster charge is located.

Accordingly, it is an object of the invention to provide an improved pyrotechnic gas generator which comprises a receptacle having a portion defining a charge chamber with a plurality of recesses for accommodating charges in a fixed position and in spaced relationship so that they burn around their periphery and including gas passage means from a primer charge outwardly to the individual charges and then to a sound chamber defined in communication with the charge chamber.

A further object of the invention is to provide a pyrochemical gas generator which is particularly suitable for inflating bounce protection devices and which comprises a receptacle in the form of a pot-like lower part which is of pot-shape configuration and is closed on the top by a firing grate and by an intermediate wall part which in turn is closed on its top by a cover and wherein the bottom portion defines a cartridge receiving chamber for holding cartridges in spaced concentric arrangement around a primer charge and which includes passage means to the upper portion which defines a sound absorber.

A further object of the invention is to provide a pyrotechnic gas generator which is simple in design, rugged in construction and economical to manufacture.

For an understanding of the principles of the invention reference is made to the following description of a typical embodiment thereof as illustrated in the accompanying drawing.

DESCRIPTION OF THE PREFERRED EMBODIMENT

Figure 1:
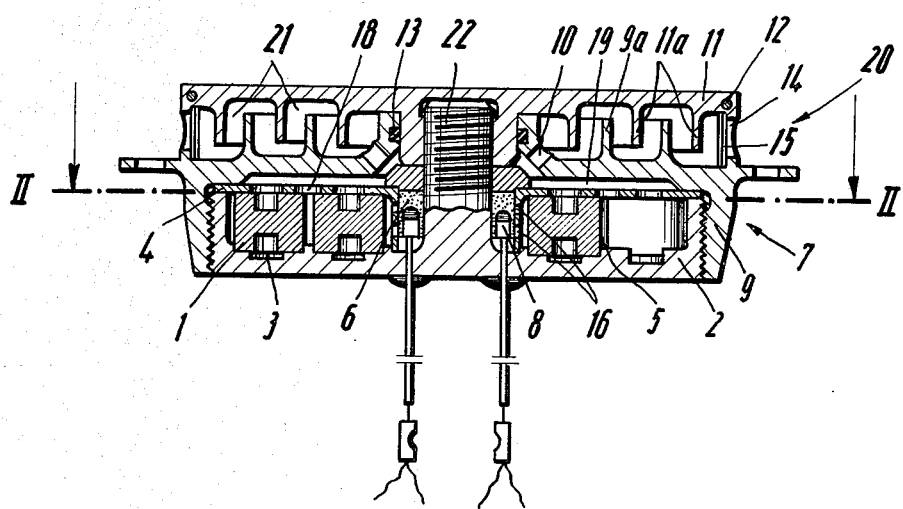
FIG. 1 is a sectional view of a pyrotechnical gas generator constructed in accordance with the invention.

Referring to the drawing in particular, the invention embodied therein, comprises a cylindrical receptacle 7 having a lower part or bottom 2 with a bottom interior wall having a plurality of cylindrical recesses 5 for accommodating individual charges 1 which comprise a pyrochemical mixture. The lower part includes a central hub portion 22 which is threaded at its upper end and it is threadedly engaged by a cover 11 which fits over an intermediate housing 9 and is threaded onto the upstanding hub portion 22. The space between intermediate housing 9 and cover 11 defines a sound absorber, generally designated 20.

Figure 2:
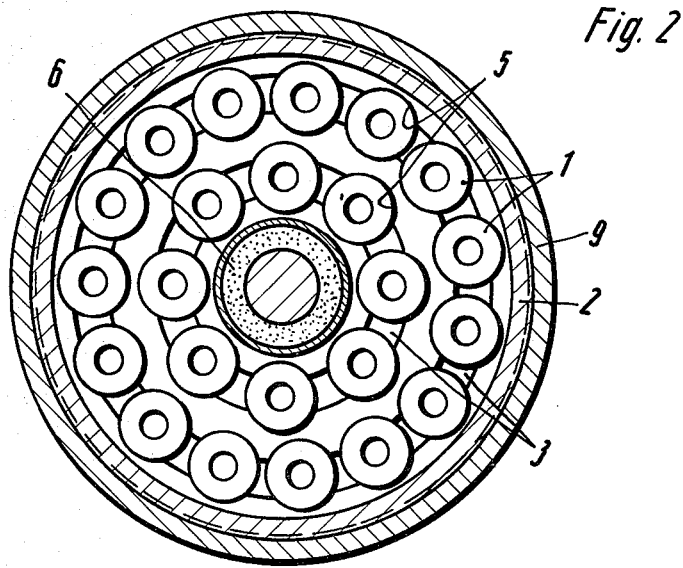
FIG. 2 is a section taken on the line II—II of FIG. 1.

The individual charges 1 are of cylindrical shape and, as seen particularly from FIG. 2, are arranged in individual recesses 5 so that their entire sides are exposed completely around their peripheries for burning. The grooves 3 form communication passages for the combustion gases as well as for the boosting.

A firing grate 4 fits over the top of the lower part 2 and it includes an apertured hub portion which is spaced away from hub portion 22. The space between the firing grate and the bottom 2 defines a collector space or charge space and is designated 19. The firing grate is formed with bores 16 on its hub portion and additional bores 18 at its top portion which are usually covered with an aluminum foil which serve as a bursting diaphragm.

The sound absorber 20 which is located above the collector space 19 comprises the intermediate housing 9 and the closure portion or cover 11. The interior of sound absorber 20 communicates with collector space 19 through bores 10 which are covered with an aluminum foil. The sound absorber is formed with a plurality of deflection steps or void spaces and it is provided with radial outlet openings 14 distributed around its periphery. The deflection steps are defined by depending partition walls 11a of the cover 11 which are located between upstanding partition walls 9a of intermediate housing 9. A security ring 12 is provided to fix the closure portion 11 to the housing 9. A seal ring 13 is provided for sealing the closure portion 11 with respect to housing 9. Depending upon the amount of threading of the cover or closure portion 11 onto the threaded journal 22, there is a regulation of a size of a passage 10 which communicates between the cartridge chamber or collector space 19 and the sound absorber 20. The chamber 6 defined between hub 22 and the hub portion of the grate 4 provides a space for electrically actuated primer capsules 8 and also for a booster charge.

The gas generator operates as follows:

Upon ignition, the booster gases pass through bores 16 of grate 4 and they are distributed along the periphery of firing grate 4 into cartridge chamber 19 of lower part 2. Charges 1 are ignited on their entire surface. The gases produced by the charges 1 flows through bores 18 provided in the firing grate 4 to bores 10 which are dimensioned in accordance with the amount of clamping of cover 11 and then into sound absorber 20. In sound absorber 20, the gases are conducted through the deflection steps 21 where it is expanded and its temperature is reduced. The gas escapes into the inflatable bag or other protection device (not shown) through filter gauzes 15 and outlet openings 14.

While a specific embodiment of the invention has been shown and described in detail to illustrate the application of the principles of the invention, it will be understood that the invention may be embodied otherwise without departing from such principles.

What is claimed is:

1. A pyrochemical gas generator, comprising a cylindrical receptacle having upper and lower parts, said lower part having a bottom interior wall with a plurality of concentric grooves defined therein and also a plurality of cylindrical recesses arranged in spaced relationship around each groove and defining annular charge support ledges above the grooves which extend beyond each side of the associated groove, a plurality of preformed explosive charges each having a predetermined defined burning surface and each being seated on a respective support ledge above the associated grooves with substantially their outer peripheries exposed for burning, said grooves forming communicating gas passages for the combustion gases during burning of said charges, a firing grate having a gas passage therethrough engaged over said lower part and over said charges, and a gas outlet connected to said receptacle upper part above said grate.

2. A pyrochemical gas generator according to claim 1, including an intermediate housing portion between said upper and lower parts overlying said firing grate and having a bore therethrough for the passage of gases communicating above said intermediate housing portion to said gas outlet, said intermediate housing portion and said upper part having spaced apart walls defining a tortuous gas path forming a sound dampener.

3. A pyrochemical gas generator, according to claim 1, including a filter gauze closing said gas outlet, thereby retaining the combustion residues contained in the escaping gases.

4. A pyrochemical gas generator, according to claim 1, including a threaded journal concentrically arranged in respect of said bottom wall part and extending upwardly therefrom, said upper part being threaded onto said journal.

5. A pyrochemical gas generator, according to claim 4, wherein said grate includes a hub portion spaced radially outwardly from said threaded journal, and a primer capsule chamber defined between said hub portion of said grate and said journal and containing electric primer capsules.

6. A pyrochemical gas generator, comprising a cylindrical receptacle having an upper part and a lower part with an intermediate part between said upper and lower part, said lower part having a bottom wall with a plurality of concentric grooves defined therein and also a plurality of cylindrical recesses defined therein arranged in spaced relationship around each groove and each defining an annular charge support ledge above the associated grooves and extending beyond each side thereof, a plurality of preformed explosive charge bodies each having a predetermined defined burning surface and each being seated on a respective support ledge above the associated groove with substantially the entire outer peripheries exposed for burning, said grooves forming communicating gas passages for combustion gases during the burning of said charges, a firing grate having a gas passage therethrough engaged over said charges between said intermediate housing portion and said charges, said intermediate housing portion defining a gas collection space above a portion of said firing grate, said intermediate housing portion having at least one bore therethrough for the passage of gas, the space between said intermediate housing portion and said upper part defining a gas sound dampening chamber communicating with the bore through said intermediate housing portion and wall means defining a tortuous gas flow path from said gas passage bore through said intermediate housing and having an outlet extending out of said housing.

7. A pyrochemical gas generator according to claim 6, wherein said upper part of said intermediate housing portion and the bottom part of said upper housing part have oppositely projecting alternately arranged ribs defining said tortuous gas path between said intermediate housing portion and said upper part.

8. A pyrochemical gas generator according to claim 6, wherein said upper housing part and said lower housing part have threadably interengageable hub portions, a bore through said intermediate housing part being located so as to be partially covered by a portion of said upper housing part the amount of covering being determined by the amount of threadable engagement between said upper and lower housing parts.

* * * * *